United States Patent
Probst et al.

(10) Patent No.: US 6,686,088 B2
(45) Date of Patent: Feb. 3, 2004

(54) HEADER INSULATOR FOR AN ELECTROCHEMICAL CELL

(75) Inventors: Joseph M. Probst, Williamsville, NY (US); William M. Paulot, Lancaster, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 159 days.

(21) Appl. No.: 10/118,295

(22) Filed: Apr. 8, 2002

(65) Prior Publication Data

US 2002/0110734 A1 Aug. 15, 2002

Related U.S. Application Data

(60) Continuation-in-part of application No. 09/844,639, filed on Apr. 27, 2001, now Pat. No. 6,475,669, which is a division of application No. 09/359,507, filed on Jul. 23, 1999, now Pat. No. 6,224,999.

(51) Int. Cl.[7] .................. H01M 2/04; H01M 2/08; H01M 2/30
(52) U.S. Cl. .............. 429/175; 429/101; 429/181; 429/199; 29/623.2
(58) Field of Search .................. 429/175, 101, 429/199, 177, 186, 181; 29/623.2

(56) References Cited

U.S. PATENT DOCUMENTS

| | | |
|---|---|---|
| 2,527,576 A | 10/1950 | Ruben |
| 4,191,806 A | 3/1980 | Levy |
| 4,242,425 A | 12/1980 | O'Boyle et al. |
| 4,320,182 A | 3/1982 | Sugalski |
| 4,601,962 A | 7/1986 | Zayatz |
| 4,637,966 A | 1/1987 | Uba et al. |
| 5,250,373 A | 10/1993 | Muffoletto et al. |
| 5,312,458 A | 5/1994 | Muffoletto et al. |
| 5,434,017 A | 7/1995 | Berkowitz et al. |
| 5,624,767 A | 4/1997 | Muffoletto et al. |
| 5,626,988 A | 5/1997 | Daniel-Ivad et al. |
| 5,674,639 A | 10/1997 | Urry |
| 5,811,206 A | 9/1998 | Sunderland et al. |

Primary Examiner—John S. Maples
(74) Attorney, Agent, or Firm—Michael F. Scalise

(57) ABSTRACT

A header insulator for an electrochemical cell is described. The header insulator provides a boss for the terminal ferrule, a boss for the fill ferrule, and at least one boss disposed along the length of the insulator to provide for alignment of the electrode assembly inside the case.

27 Claims, 4 Drawing Sheets

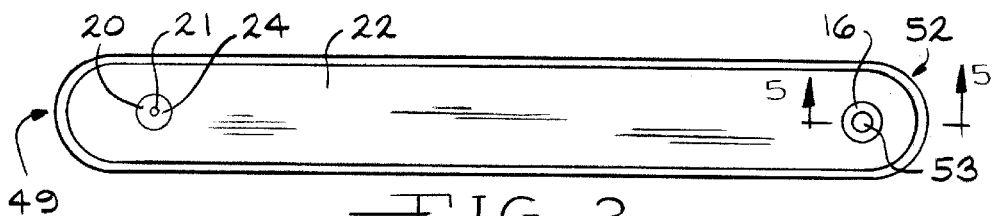
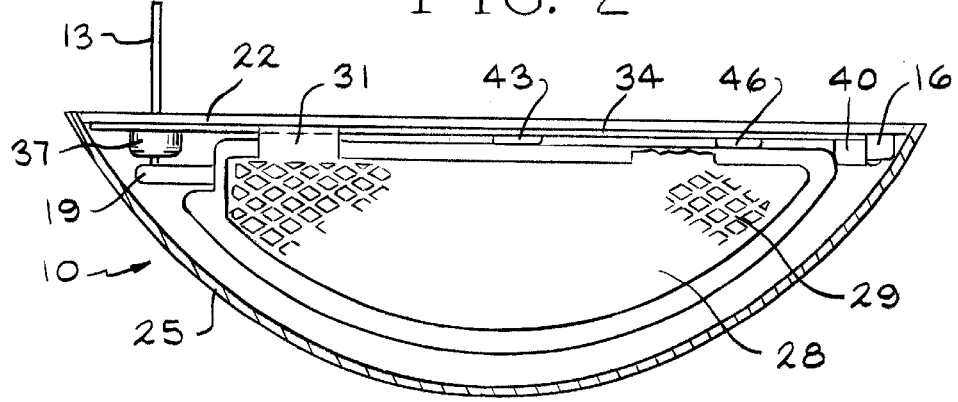
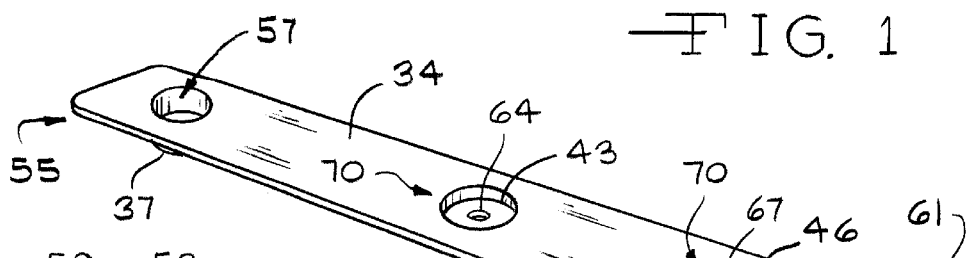
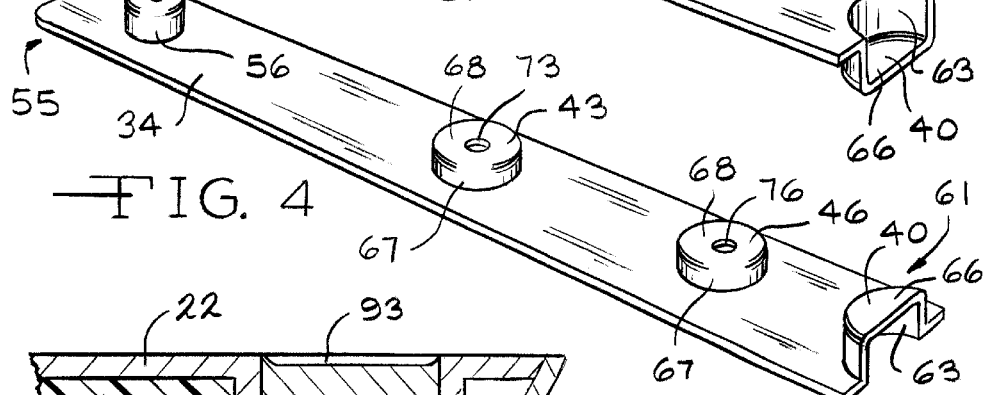
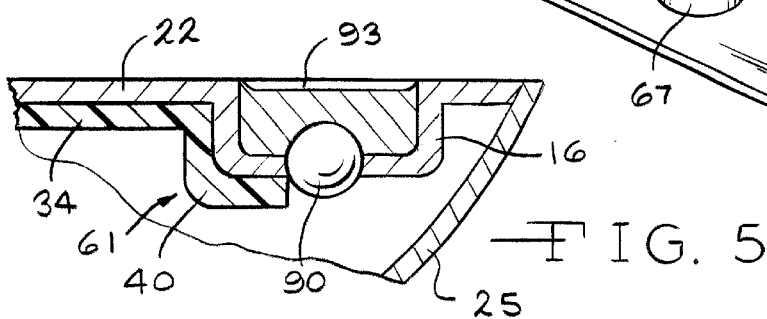

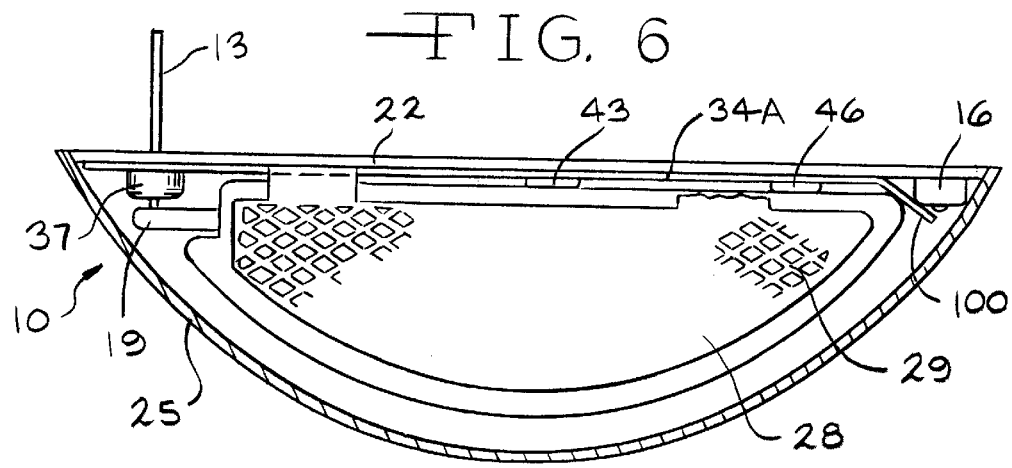
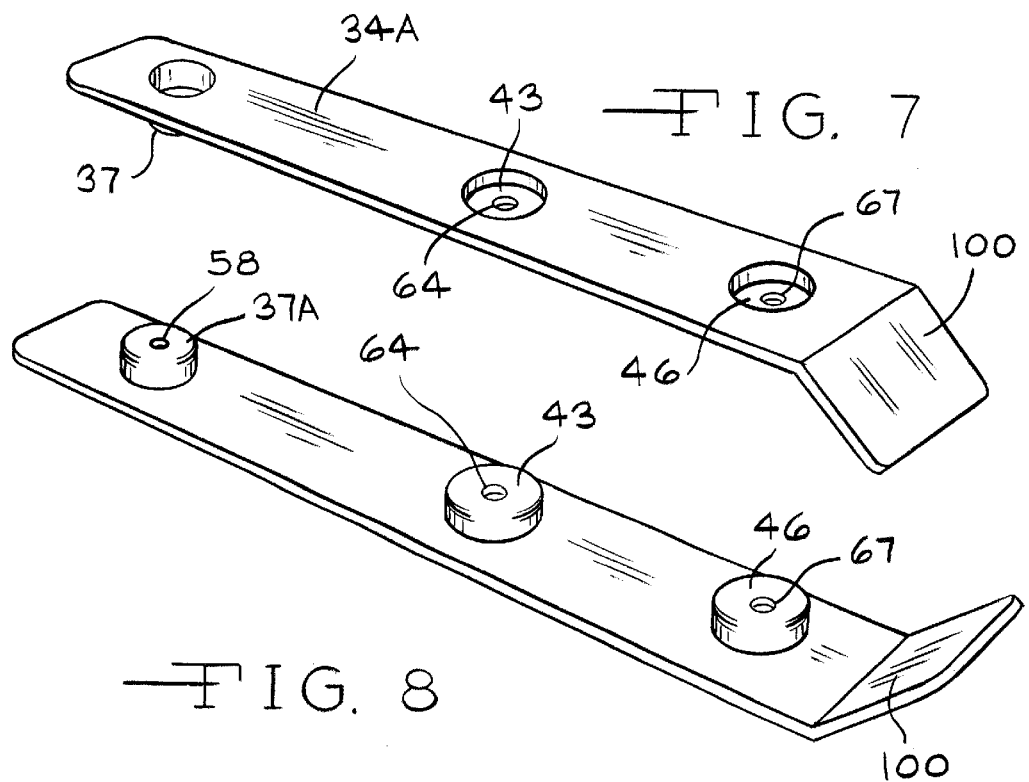

HEADER INSULATOR FOR AN ELECTROCHEMICAL CELL

CROSS-REFERENCE TO RELATED APPLICATION

The present application is a continuation-in-part of application Ser. No. 09/844,639, filed Apr. 27, 2001, now U.S. Pat. No. 6,475,669, which is a divisional of application Ser. No. 09/359,507, filed Jul. 23, 1999 now U.S. Pat. No. 6,224,999 to Probst et al.

FIELD OF INVENTION

The present invention relates to the art of electrochemical cells, and more particularly, to a new and improved header insulator for an electrochemical cell used in implantable medical devices. Further, the present invention relates to an electrochemical cell comprising the novel header insulator and a method of providing an electrochemical cell incorporating the same.

BACKGROUND OF THE INVENTION

Present battery designs typically include several insulators assembled to the inside of a battery header. First, the terminal ferrule for case conductive designs is usually provided with an insulator that serves two primary functions. The insulator electrically insulates the terminal ferrule and the feed-through pin from the internal electrodes of the battery. Also, it isolates the glass to metal seal and prevents leakage of electrolyte.

Second, an insulating strap type insulator is typically disposed adjacent to the interior surface of the header in order to electrically insulate the internal surface of the header from the internal electrodes of the battery to prevent short circuits.

Third, a welding shield provides thermal insulation between the header and the internal battery components (in particular the separator) when the header is welded to the top of the battery case.

Finally, the fill ferrule is also usually provided with an insulator that serves a couple of functions. It electrically insulates the fill ferrule from the internal electrodes of the battery, and it thermally insulates the fill ferrule from other internal battery components, particularly the separator, when the final close weld is conducted.

Each of the individual insulators adds to the manufacturing costs and adds to the steps required for assembly. Accordingly, what is needed is a unitary header insulator that meets all of the electric and thermal insulation requirements of the above-described insulators and that facilitates alignment of the battery electrodes within the case.

SUMMARY OF THE INVENTION

The present invention meets the above-described needs by providing a header insulator that is preferably manufactured from a material with properties for electrical and thermal insulation and that is formed as a unitary member having a plurality of integrally formed bosses. The header insulator provides a terminal ferrule boss, a fill ferrule boss, and at least one additional boss for maintaining the alignment of the battery electrodes.

The present invention is disposed between the lid of an electrochemical cell and the electrode assembly. In a typical electrochemical cell, the electrode assembly has terminal leads extending from the anode electrode and the cathode electrode such that positive and negative terminals are created for attachment to an external circuit. In a "case negative" configuration, the anode electrode is connected to the case serving as the negative terminal. A feed-through pin establishes the positive terminal and is connected to the cathode electrode through an opening in the lid. The inside of the opening is a glass insulator that keeps the cathode electrically isolated from the case.

The present invention provides a header insulator with a first boss capable of registering with the terminal ferrule such that it is electrically and thermally insulated from the electrode assembly. A second boss on the opposite side of the insulator provides for thermal and electrical insulation of the fill ferrule from the remainder of the electrode assembly. Additional bosses are disposed along the length of the insulator and extend downward into the case such that the electrode assembly is prevented from becoming misaligned. If the electrodes become misaligned, the performance of the battery is degraded.

The design of the present invention is advantageous for several reasons. First, substitution of a single insulating member for several insulating members reduces the costs associated with manufacturing due to fewer parts and easier assembly. Second, the additional bosses on the header insulator maintain alignment of the electrode assembly such that discharge performance is not degraded by misalignment of the anode and cathode electrodes. The additional bosses are advantageously equipped with openings to prevent isolated build-up of electrolyte that could lead to decreased battery performance.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the figures of which:

FIG. 1 is a cut-away, side elevational view of an electrochemical cell 10 provided with a header insulator 34 of the present invention.

FIG. 2 is a plan view of the lid 22 of the electrochemical cell 10.

FIG. 3 is a perspective view of the top of the header insulator 34 of the present invention.

FIG. 4 is a perspective view of the bottom of the header insulator 34.

FIG. 5 is a sectional view taken along line 5—5 of FIG. 2.

FIG. 6 is a cut-away, side elevational view of an electrochemical cell 10 having an alternate embodiment of the header insulator 34A of the present invention.

FIG. 7 is a top perspective view of the alternate embodiment of the header insulator 34A.

FIG. 8 is a bottom perspective view of the header insulator 34A shown in FIGS. 6 and 7.

DESCRIPTION OF THE PREFERRED EMBODIMENTS

Figure 9:
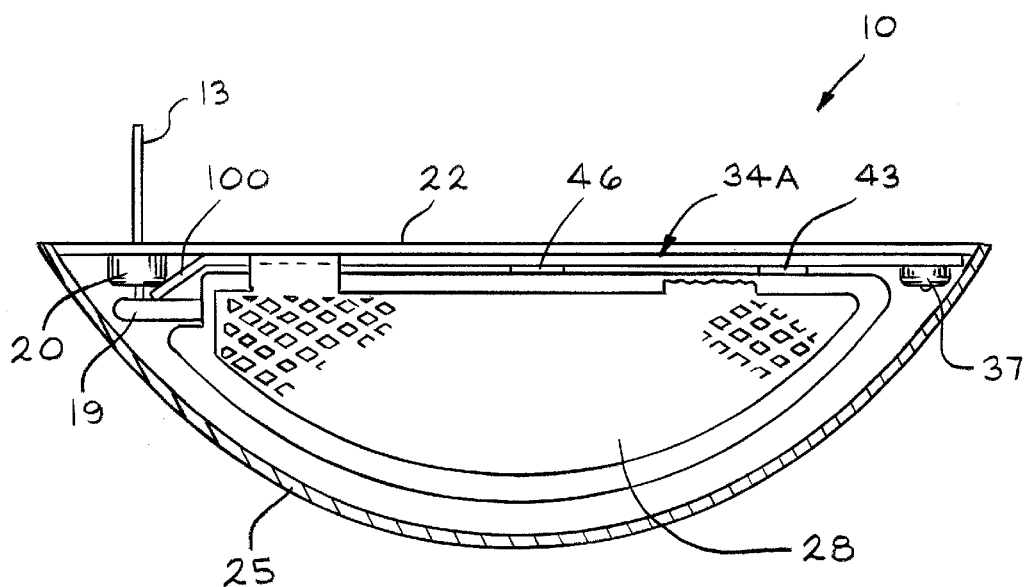
FIG. 9 is a cut-away, side elevational view of the electrochemical cell 10 provided with the header insulator 34A shown in FIGS. 6 to 8 disposed in a different orientation.

Turning now to the drawings, FIG. 1 shows an exemplary prismatic electrochemical cell 10 having a feed-through pin 13 and a fill ferrule 16. Although the present invention is described in connection with a prismatic cell, it is not intended to be limited to that configuration. Accordingly, the present invention is suitable for use with other shapes of battery cases and other types of electrode assemblies. The general design of the prismatic electrochemical cell 10 is well known in the art, and an example is provided in U.S. Pat. No. 5,750,286 to Paulot et al., which is assigned to the assignee of the present invention and incorporated herein by reference. The feed-through pin 13 is connected by a tab 19 to a cathode electrode (hidden underneath the anode). The pin 13 passes through an opening 21 (shown in FIG. 2) in the lid 22 and is electrically insulated from the anode electrode and the case 25 including the lid 22 by a glass insulator 24 sealing between the pin 13 and the terminal ferrule 20. The anode electrode 28 is shown with a current collector screen 29 attached thereto by methods known to those of ordinary skill in the art. The anode electrode 28 has a tab 31 that preferably connects to the underside of the lid 22, as disclosed in U.S. Pat. No. 5,250,373 to Muffoletto et al., which is assigned to the assignee of the present invention and incorporated herein by reference. By connecting the anode electrode to the lid 22, the electrochemical cell 10 is thereby disposed in a "case-negative" configuration.

A header insulator 34 according to the present invention has a first boss 37 in registry with the terminal ferrule 20 and a second boss 40 that partially encapsulates fill ferrule 16. A third boss 43 and a fourth boss 46 also extend from the underside of the header insulator 34, as described herein below.

In FIG. 2, the lid 22 is preferably planar, elongate and curved at opposite ends 49, 52. The lid 22 has an opening 21 for the ferrule 20 sealed about the feed-through pin 13 at the first end 49 and an opening 53 for the fill ferrule 16 at the opposite end 52. After the fill ferrule 16 is used to fill the cell 10 with electrolyte, the fill ferrule is sealed. An example of a hermetic seal for the electrolyte fill opening is disclosed in U.S. Pat. No. 5,776,632 to Honegger, which is assigned to the assignee of the present invention and incorporated herein by reference.

Referring to FIGS. 3 to 4, the header insulator 34 for use with the exemplary prismatic cell 10 is elongate, rectangular and planar. The choice of materials for the insulator depends on three principal factors: electrical insulation, thermal insulation and volume. Electrical and thermal insulation properties are necessary to prevent short circuits and to protect the electrode assembly during welding of the lid 22 to the battery case 25 and during welding of the seal for the fill ferrule 16. The volume required for the header insulator 34 is to be minimized in order to maximize the available space for electrochemically active materials.

At a first end 55 of the header insulator 34, the first boss 37 preferably comprises a cylindrically-shaped side wall 56 having an open end 57 connected to the body of the header insulator 34. The cylindrical side wall 56 extends to a bottom wall 59 that is parallel to the upper and lower surfaces of the header insulator 34 and includes an opening 58 that receives the feed-through pin 13. The opening 58 is aligned along the longitudinal axis of the boss 37. The cylindrical side wall 56 and bottom wall 59 of the first boss 37 form a recess that snugly receives the terminal ferrule 20 in an interference fit. Other shapes and sizes for the first boss 37 besides cylindrical are also suitable, depending on the geometry of the terminal ferrule 20 Also, the first boss 37 need not necessarily have the bottom wall 59. An open ended cylinder 56 may be all that is required in some applications.

At the opposite end 61 of the header insulator 34, the second boss 40 registers with the fill ferrule 16. The second boss 40 is shaped substantially in the form of a bisected cylinder having a side wall 63 and a bottom wall 66. As such, the second boss 40 partially encloses the fill ferrule 16 while preventing rotation of the header insulator 34 about the terminal ferrule 20 at the first boss 37. In a similar manner as the first boss 37, the second boss 40 need not necessarily have the bottom wall 66. In some applications, the bisected cylindrical side wall 63 is all that is needed. The seals 90, 93 (FIG. 5) hermetically close the fill ferrule 16, as described in the previously referenced U.S. Pat. No. 5,776,632 to Honegger.

The third and fourth bosses 43, 46 are disposed intermediate the first boss 37 and the second boss 40 along the length of the header insulator 34. The intermediate bosses 43 and 46 are shown in the form of cylinders having respective side walls 67 extending between bottom walls 68 and openings 70 communicating with the main body of the header insulator 34. The bottom walls 68 on each boss 43, 36 are preferably coplanar and parallel to the upper and lower surfaces of the header insulator 34 for maintaining alignment of the electrode assembly inside the case 25. However, the specific geometry of the intermediate bosses is not critical. Other shapes and sizes are also suitable depending on the application. For example, it is contemplated by the scope of the present invention that the intermediate boss is a solid member depending downwardly from the lower surface of the body of the header insulator 34. Also, the number of intermediate bosses 43, 46 is not critical as their width can vary. In fact a single, wider boss may be suitable in some applications.

In that respect, the third and fourth bosses 43, 46 prevent improper alignment of the electrode assembly with respect to the case 25 and lid 22. In the electrode assembly disclosed in the previously discussed U.S. Pat. No. 5,250,373 to Muffoletto et al., for example, the bosses 43, 46 abut with the center portion of the anode. The central portion of the anode electrode is substantially flat and disposed parallel to the lid 22 of the case 25 while a pair of anode wing portions reside immediately adjacent to each side of the cathode electrode. Without the bosses 43, 46, the anode and cathode could shift relative to each other and the electrode assembly itself could misalign inside the casing. This, in turn, would impact discharge performance.

The bottom walls 68 of the third and fourth bosses 43, 46 preferably have respective openings 73, 76 disposed along the longitudinal axes of the bosses to allow for escape of electrolyte. The openings 73, 76 may not be required in applications where electrolyte does not accumulate between the lid 22 and the header insulator 34.

FIGS. 6 to 8 show an alternate embodiment of the header insulator 34A for the exemplary electrochemical cell 10. In contrast to the header insulator 34 (FIGS. 1, 3 to 5), the boss 40 that partially enclosed the fill ferrule 16 has been removed and replaced by an angled planar member 100. The angled planar member 100 segregates and shields the fill ferrule 16 from the electrode assembly to prevent a short circuit between them.

FIG. 9 shows the exemplary electrochemical cell having the header insulator 34A turned around with respect to that shown in FIGS. 6 and 7 so that the angled planar member 100 shields the terminal ferrule 20. In this embodiment, the first boss 37 is in registry with the fill ferrule 16. As before, the third and fourth bosses 43 and 46 are disposed intermediate the first boss 37 and the angled planar member 100 to maintain proper alignment of the electrode assembly inside the case 25.

Figure 10:
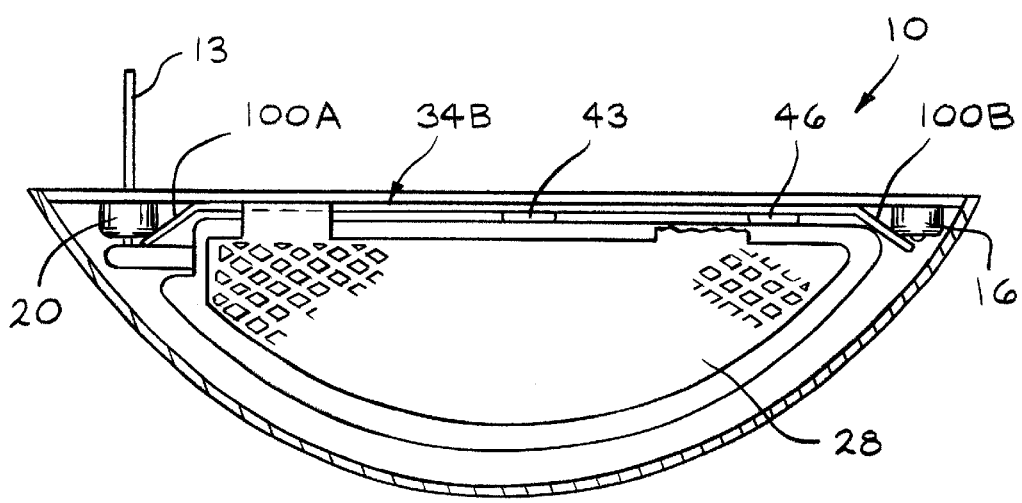
FIG. 10 is a cut-away, side elevational view of the electrochemical cell 10 provided with another embodiment of a header insulator 34B of the present invention.

FIG. 10 shows another embodiment of the exemplary electrochemical cell comprising a header insulator 34B as a variation of the header insulator 34A shown in FIGS. 6 to 9. Header insulator 34B comprises angled planar members 100A and 100B disposed at its opposed ends. The angled planar members 100A and 100B shield the respective terminal ferrule 20 and the fill ferrule 16. As before, the third and fourth bosses 43 and 46 are disposed intermediate the angled planar members 100A and 100B to maintain proper alignment of the electrode assembly inside the case 25.

Figure 11:
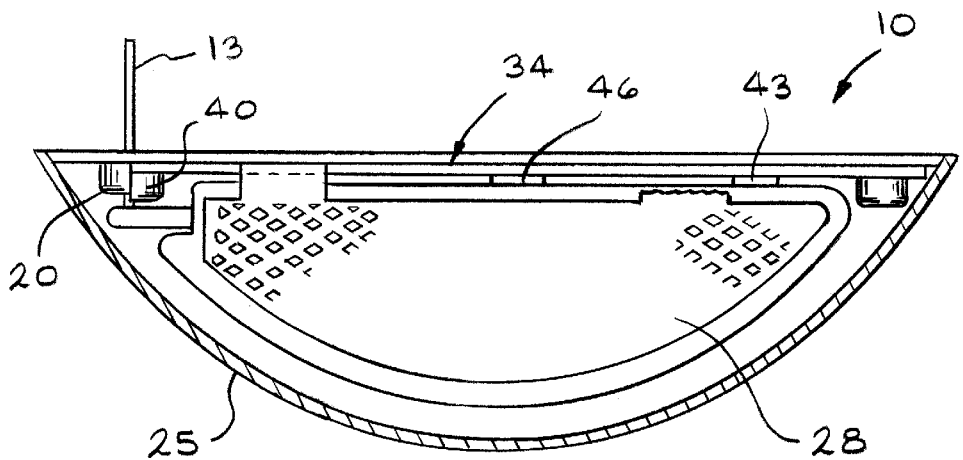
FIG. 11 is a cut-away, side elevational view of the electrochemical cell 10 provided with the header insulator 34 shown in FIGS. 1 and 3 to 5 disposed in a different orientation.

FIG. 11 shows another embodiment of the exemplary electrochemical cell having the header insulator 34 of FIGS. 3 to 5 turned around with respect to the orientation of FIG. 1 so that the second boss 40 partially encloses and registers with the terminal ferrule 20. Again, the third and fourth bosses 43, 46 are disposed intermediate the first and second bosses 37, 40 to maintain proper alignment of the electrode assembly inside the case 25.

Figure 12:
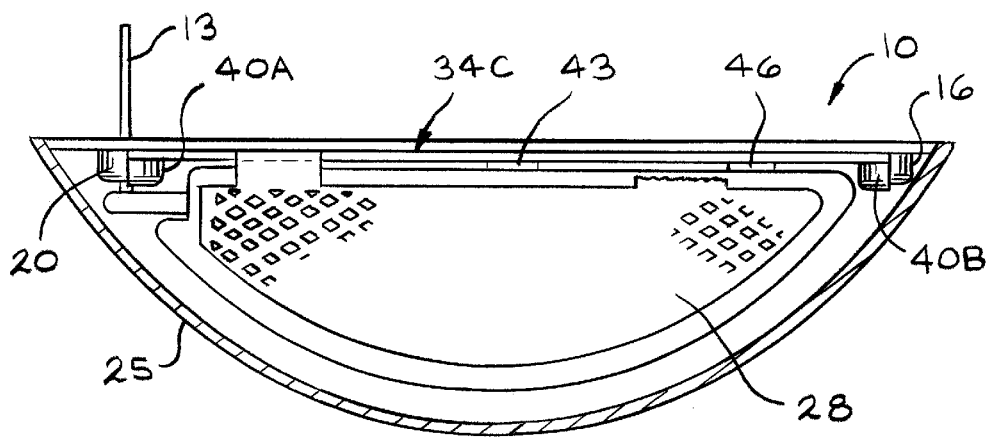
FIG. 12 is a cut-away, side elevational view of the electrochemical cell 10 provided with another embodiment of a header insulator 34C of the present invention.

FIG. 12 shows another embodiment of the exemplary electrochemical cell having a header insulator 34C as a variation of the header insulator 34 shown in FIGS. 1, 3 to 5 and 11. Header insulator 34C comprises opposed bisected cylindrical bosses 40A and 40B partially enclosing and registering with the respective fill ferrule 16 and the terminal ferrule 20. The third and fourth bosses 43, 46 are disposed intermediate the bosses 40A and 40B to maintain proper alignment of the electrode assembling inside the case 25.

While FIGS. 1, 3 to 5, 11 and 12 show the first boss 37 having a cylindrical side wall and the second boss 40 having a bisected cylindrical structure, it is within the scope of the present invention that either the first or the second bosses can have a curved side wall forming a partial cylinder. Such a partial cylindrical side wall can extend anywhere from about 5% to about 100% of the way around the perimeter of the ferrule with which it is in registry. The partial cylindrical side wall can extend to a bottom wall, or not, depending on the design of the particular electrochemical cell. Also, the bosses 37, 40 can comprise side walls that are not curved, such as those having an obtuse angular cross-section.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. An electrochemical cell, which comprises:
a) a casing having a surrounding side wall extending to an open end of the casing;
b) an electrode assembly comprising an electrically associated first electrode and a second electrode with an intermediate separator disposed inside the casing;
c) a lid sealed to the open end of the casing, the lid comprising an electrolyte fill ferrule and a terminal ferrule;
d) a header body disposed between the electrode assembly and an interior surface of the lid closing the open end of the casing;
e) a terminal lead supported in the terminal ferrule and comprising a first end connected to the first electrode and a second end connectable to a load, and wherein the second electrode is connected to a second terminal;
f) an electrolyte solution provided in the casing to activate the electrode assembly;
g) a seal for the electrolyte fill ferrule; and
h) wherein the header body comprises a first structure depending from the header body to at least partially cover the terminal ferrule, a second structure depending from the header body to prevent movement of the electrode assembly inside the casing, and a third structure depending from the header body to at least partially cover the fill ferrule, wherein the first structure is selected from the group consisting of:
  i) a first side wall depending from a lower surface of the header body to at least partially surround the terminal ferrule; and
  ii) a first portion disposed at a second angle with respect to a first angle of the header body; and
  wherein the third structure is selected the group consisting of:
  i) a third side wall depending from the lower surface of the header body to at least partially surround the fill ferrule; and
  ii) a third portion disposed at a third angle with respect to the first angle of the header body.

2. The electrochemical cell of claim 1 wherein the first side wall extends from about 5% to about 100% of the way about the perimeter of the terminal ferrule.

3. The electrochemical cell of claim 2 wherein the first side wall extends to a first bottom wall.

4. The electrochemical cell of claim 1 wherein the third side wall extends from about 5% to about 100% of the way about the perimeter of the fill ferrule.

5. The electrochemical cell of claim 4 wherein the third side wall extends to a third bottom wall.

6. An electrochemical cell, which comprises:
a) a casing having a surrounding side wall extending to an open end of the casing;
b) an electrode assembly comprising an electrically associated first electrode and a second electrode with an intermediate separator disposed inside the casing;
c) a lid sealed to the open end of the casing, the lid comprising an electrolyte fill ferrule and a terminal ferrule;
d) a header comprising a generally planar header body having an upper surface proximate a lower surface of the lid and a spaced apart lower surface providing the header body with a thickness between the upper and lower surfaces;
e) a terminal lead supported in the terminal ferrule and comprising a first end connected to the first electrode and a second end connectable to a load, and wherein the second electrode is connected to a second terminal;
f) an electrolyte solution provided in the casing to activate the electrode assembly;
g) a seal for the electrolyte fill ferrule; and h) wherein the header comprises a first structure depending from the header body to cover at least a portion of the terminal ferrule, a second structure depending from the header body to prevent movement of the electrode assembly inside the casing, and a third structure depending from the header body to cover at least a portion of the fill ferrule.

7. The electrochemical cell of claim 6 wherein the first structure has a surrounding first side wall extending from about 5% to about 100% of the way about the perimeter of the terminal ferrule and the third structure has a surrounding third side wall extending from about 5% to about 100% of the way about the perimeter of the fill ferrule.

8. The electrochemical cell of claim 7 wherein the first surrounding side wall and the third surrounding side wall extend to respective first and third bottom walls.

9. The electrochemical cell of claim 6 wherein the first structure has a first portion disposed at a second angle with respect to a first angle of the planar header body and the third structure has a third portion disposed at a third angle with respect to the first angle of the header body.

10. The electrochemical cell of claim 6 wherein the first structure has a partial cylindrical first side wall and the third structure has a partial cylindrical third side wall, both depending from the lower surface of the header body to respective first and third bottom walls disposed generally parallel to the planar header body.

11. The electrochemical cell of claim 6 wherein the first structure has a bisected cylindrical first side wall and the third structure has a bisected cylindrical third side wall, both depending from the lower surface of the header body to respective first and third bottom walls disposed generally parallel to the planar header body.

12. The electrochemical cell of claim 6 wherein the second structure has a cylindrical second side wall depending from a lower surface of the header body to a second bottom wall disposed generally parallel to the planar header body.

13. The electrochemical cell of claim 12 wherein the second bottom wall has an opening.

14. The electrochemical cell of claim 12 wherein the cylindrical second side wall is open to an upper surface of the header body.

15. The electrochemical cell of claim 6 wherein the second structure is solid.

16. A method for providing an electrochemical cell, the method comprising the steps of:
   a) providing a casing having a surrounding side wall extending to an open end of the casing;
   b) housing an electrode assembly comprising an electrically associated first electrode and a second electrode with an intermediate separator disposed inside the casing;
   c) providing a header having a generally planar header body supported on the electrode assembly, the header having an upper surface and a spaced apart lower surface providing the header body with a thickness between the upper and lower surfaces;
   d) sealing a lid to the open end of the casing, the lid comprising an electrolyte fill ferrule and a terminal ferrule, wherein the upper surface of the header is proximate the lid;
   e) providing a terminal lead supported in the terminal ferrule, the terminal lead comprising a first end disposed inside the casing connected to the first electrode and a second end connectable to a load, and connecting the second electrode to a second terminal;
   f) filling an electrolyte solution into the casing through the fill ferrule;
   g) sealing the electrolyte fill ferrule; and
   h) wherein at least a portion of the terminal ferrule is covered by a first structure depending from the header body, and wherein the electrode assembly in prevented from moving inside the casing by a second structure depending from the header body, and wherein at least a portion of the fill ferrule is covered by a third structure depending from the header body.

17. The method of claim 16 including selecting the first structure from the group consisting of:
   a) a first side wall depending from a lower surface of the header body to at least partially surround the terminal ferrule; and
   b) a first portion disposed at a second angle with respect to a first angle of the planar header body.

18. The method of claim 16 including selecting the third structure from the group consisting of:
   a) a third side wall depending from the lower surface of the header body to at least partially surround the fill ferrule; and
   b) a third portion disposed at a third angle with respect to the first angle of the planar header body.

19. The method of claim 16 including providing the first structure having a surrounding first side wall extending from about 5% to about 100% of the way about the perimeter of the terminal ferrule and the third structure having a surrounding third side wall extending from about 5% to about 100% of the way about the perimeter of the fill ferrule.

20. The method of claim 16 including providing the first structure having a bisected cylindrical first side wall and the third structure having a bisected cylindrical third side wall.

21. The method of claim 16 including providing the first structure having a first portion disposed at a second angle with respect to a first angle of the planar header body and the third structure having a third portion disposed at a third angle with respect to the first angle of the header body.

22. The method of claim 16 including providing the first structure having a partial cylindrical first side wall and the third structure having a partial cylindrical third side wall, both depending from the lower surface of the header body to respective first and third bottom walls disposed generally parallel to the planar header body.

23. The method of claim 16 including providing the first structure having a bisected cylindrical first side wall and the third structure having a bisected cylindrical third side wall, both depending from the lower surface of the header body to respective first and third bottom walls disposed generally parallel to the planar header body.

24. The method of claim 16 including providing the second structure having a cylindrical second side wall depending from a lower surface of the header body to a second bottom wall disposed generally parallel to the planar header body.

25. The method of claim 24 including providing the second bottom wall having an opening.

26. The method of claim 24 including providing the cylindrical second side wall being open to the upper surface of the header body.

27. The method of claim 16 including providing the second structure being solid.

* * * * *

UNITED STATES PATENT AND TRADEMARK OFFICE
CERTIFICATE OF CORRECTION

PATENT NO. : 6,686,088 B2
DATED : February 3,. 2004
INVENTOR(S) : Probst, et al.

It is certified that error appears in the above-identified patent and that said Letters Patent is hereby corrected as shown below:

<u>Column 8,</u>
Line 6, "in" should be -- is --

Signed and Sealed this

Twenty-fifth Day of May, 2004

JON W. DUDAS
*Acting Director of the United States Patent and Trademark Office*